United States Patent
Reial et al.

(10) Patent No.: US 11,038,578 B2
(45) Date of Patent: Jun. 15, 2021

(54) METHOD AND DEVICE FOR DIRECTIONAL RECIPROCITY IN UPLINK AND DOWNLINK COMMUNICATION

(71) Applicant: Telefonaktiebolaget LM Ericsson (publ), Stockholm (SE)

(72) Inventors: Andres Reial, Malmö (SE); Rui Fan, Beijing (CN); Johan Rune, Lidingö (SE); Claes Tidestav, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 13 days.

(21) Appl. No.: 16/607,791

(22) PCT Filed: Apr. 27, 2017

(86) PCT No.: PCT/CN2017/082135
§ 371 (c)(1),
(2) Date: Oct. 24, 2019

(87) PCT Pub. No.: WO2018/195841
PCT Pub. Date: Nov. 1, 2018

(65) Prior Publication Data
US 2020/0212989 A1    Jul. 2, 2020

(51) Int. Cl.
*H04W 4/00* (2018.01)
*H04B 7/08* (2006.01)
(Continued)

(52) U.S. Cl.
CPC ........... *H04B 7/086* (2013.01); *H04B 7/0469* (2013.01); *H04B 7/0617* (2013.01); *H04B 17/336* (2015.01)

(58) Field of Classification Search
CPC .. H04B 17/336; H04B 7/0469; H04B 7/0617; H04B 7/0695; H04B 7/086
See application file for complete search history.

(56) References Cited

U.S. PATENT DOCUMENTS

| | | | |
|---|---|---|---|
| 2003/0087674 A1 | 5/2003 | Li et al. | |
| 2009/0196203 A1* | 8/2009 | Taira | H04B 7/0617 370/280 |

(Continued)

FOREIGN PATENT DOCUMENTS

| | | |
|---|---|---|
| CN | 101615937 A | 12/2009 |
| CN | 103905101 A | 7/2014 |

(Continued)

OTHER PUBLICATIONS

Anderson, Sören, et al., "Ericsson/Mannesmann GSM Field-Trials with Adaptive Antennas", Mannesmann Mobilfunk GmbH, Am Seestern 1, D-405 34 Düsseldorf, Germany, May 4-7, 1997, pp. 1587-1591.

*Primary Examiner* — Minh Trang T Nguyen
(74) *Attorney, Agent, or Firm* — Murphy, Bilak & Homiller, PLLC (57) ABSTRACT

The disclosure relates to devices, methods, and computer programs in mobile communications in order to enhance signal transmission. Specifically, it relates to methods in a network node. The method comprises receiving S1 a signal with at least a partly known content and applying S2 to the received signal at least one set of reception weights out of a plurality predefined sets of reception weights, wherein each set of reception weights is associated with at least one reception beam parameter describing a reception beam configuration. The method further comprises determining S3, based on one or more predetermined criteria, at least one set of reception weights out of the applied predefined sets of reception weights and generating S4 at least one set of transmission weights. Said at least one set of transmission weights is based on the at least one reception beam parameter The method further comprise transmitting S5 a signal using the generated at least one set of transmission weights.

20 Claims, 4 Drawing Sheets

(51) Int. Cl.
*H04B 17/336* (2015.01)
*H04B 7/0456* (2017.01)
*H04B 7/06* (2006.01)

(56) References Cited

U.S. PATENT DOCUMENTS

2016/0127919 A1  5/2016  Hui et al.
2018/0284217 A1* 10/2018 Takeuchi ................. H04B 7/10

FOREIGN PATENT DOCUMENTS

| WO | 2015143898 A1 | 10/2015 |
| WO | 2016013608 A1 | 1/2016 |
| WO | 2017045713 A1 | 3/2017 |

* cited by examiner

METHOD AND DEVICE FOR DIRECTIONAL RECIPROCITY IN UPLINK AND DOWNLINK COMMUNICATION

TECHNICAL FIELD

The present disclosure relates to mobile communications. More specifically, the proposed technique relates to methods for providing directional reciprocity in the uplink and downlink channels. The disclosure also relates to corresponding device and computer programs for executing the proposed methods.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex, FDD, and Time Division Duplex, TDD, modes.

In an UTRAN and an E-UTRAN, a User Equipment, UE, or a wireless device is wirelessly connected to a Radio Base Station, RBS, commonly referred to as a NodeB, NB, in UMTS, and as an evolved NodeB, eNodeB or eNB, in LTE. A Radio Base Station, RBS, or an access point/node is a general term for a radio network node capable of transmitting radio signals to a wireless device and receiving signals transmitted by a wireless device. In Wireless Local Area Network, WLAN, systems the wireless device is also denoted as a Station, STA.

LTE communication supports two different ways of simultaneous two-way communications, i.e., devices can send and receive at the same time. There are frequency division duplex, FDD, and time division duplex, TDD.

In 5G, i.e. 5th generation mobile networks, there will be evolvement of the current LTE system to 5G. The main task for 5G is to improve throughput and capacity compared to LTE, as well as reducing latency and providing support for a wide variety of wireless devices and applications. It is anticipated that 5G will be able to utilize multi-user MIMO which is a set of multiple-input and multiple-output technologies for wireless communication, in which a wireless terminal, or a set of wireless terminals, each with one or more antennas, communicate with each other (or via) one or several networks.

An aspect which affects the design of the 5G system is the fact that 5G systems are expected to often be deployed using high carrier frequency bands. In high frequencies, the propagation conditions may be less favorable and good area coverage becomes more challenging to achieve. Furthermore, with the shorter wavelengths of higher frequencies, the antenna elements become smaller and various MIMO applications, such as beamforming, where the radiated energy is focused in one or a few directions to increase coverage and/or data rates, may be achieved, using multiple (dozens or even hundreds) of antenna elements without making the dimensions of the antenna array impractically large. Beamforming may also be applied on the receiver side, where applied beamforming makes the receiver more sensitive in a certain direction (or a few directions), e.g. in the direction towards the sender of the signal that is to be received. An alternative use of beamforming is to suppress interference by reducing the receiver sensitivity in certain directions, from which interference is expected (or has been detected).

In view of the new upcoming technology where the number of "connected" devices rapidly increases there is a demand of enhancing the efficiency of the wireless communications channels between UEs and base stations and between devices communicating directly to each other.

SUMMARY

In the present disclosure, a method, a network node and a computer program are presented that provide for communication mechanisms that enhance efficiency of communication channels in wireless communication.

According to aspects of the present disclosure it is provided a method in a network node, for signal transmission. The method comprises receiving a signal with at least a partly known content. The method further comprises applying to the received signal at least one set of reception weights out of plurality of predefined sets of reception weights, wherein each set of reception weights is associated with at least one reception beam parameter describing a reception beam configuration. The method further comprises determining, based on one or more predetermined criteria, at least one set of reception weights out of the applied predefined sets of reception weights. Moreover, the method comprises generating at least one set of transmission weights, said at least one set of transmission weights based on the at least one reception beam parameter, said at least one reception beam parameter corresponding to the determined at least one set of reception weights. Furthermore, the method comprises transmitting a signal using the generated at least one set of transmission weights.

Hence, it is provided for a method to find set/s of reception weights such that a reciprocal uplink and downlink communication is achieved in situations where the channel is not reciprocal per se or where the reception circuitry and transmission circuitry is not symmetric.

It is further provided for the use of a limited number of beam shape description parameters, instead of numerous antenna element weights, to associate matching beams on the reception and transmission sides.

Furthermore, by determining several preferred reception beam configurations, the transmission precoding may parametrically include transmission in several preferred reception beam directions such that spatial diversity is obtained.

Thus, it is provided for an enhanced signal quality between wireless devices utilizing beamforming. Moreover, the method enables UL measurement-based mobility in most conceivable deployments and scenarios.

According to further aspects, the at least one set of transmission weights are associated with at least one transmission beam parameter and wherein the at least one reception beam parameter is equal to the at least one transmission beam parameter.

Thus it is ensured that the properties of the transmission beam configuration match the properties of the best reception beam configuration, regardless of the element weights that are required to generate the respective beams.

According to further aspects, the generating of at least one set of transmission weights further comprises at least one of the following:

applying a mapping from the at least one reception beam parameter to the at least one set of transmission weights;

determining the at least one set of transmission weights as a function of the at least one reception beam parameter;

retrieving the at least one set of transmission weights from a look-up table of the at least one reception beam parameter;

retrieving the at least one set of transmission weights from a look-up table using the at least one reception beam parameter as look-up key;

determining the at least one set of transmission weights by an iterative process; or any combination thereof.

The proposed method gives the skilled person a high flexibility in the choice of how to generate the transmission weights.

According to further aspects, the plurality predefined sets of reception weights comprises at least two predefined sets of reception weights and any combinations thereof.

Hence, the reception beam configuration can be designed to suit the specific situation since the number of combinations of receptions weights available are in principle infinite.

According to further aspects, the at least one beam parameter is at least one of beam direction, beam width, sidelobe levels, and polarization properties.

The complexity of finding transmission weights are reduced by utilizing a small number of beam parameters instead of the reception weights.

According to further aspects, the one or more predetermined criteria is based on at least one of received signal energy, received signal power, signal-to-noise ratio, SNR, signal-to-interference-plus-noise ratio, SINR and signal-to-interference ratio, SIR.

Thus, it is provided for a high flexibility in the choice criteria.

According to further aspects, the predefined sets of reception weights and/or the at least one generated set of transmission weights represent Discrete Fourier Transform, DFT, beams, widened beams, suppressed sidelobes beam variants and/or amplitude-tapered beam variants or combinations thereof.

Hence, the proposed methods enable to receive and transmit signals by applying different beam forming techniques.

According to further aspects, the received signal is a reference signal, a sounding signal, a synchronization signal, a mobility reference signal, MRS, a Reciprocity Reference Signal, RRS, a sounding reference signal, SRS, a pilot signal or an Uplink Synchronization Signal, USS.

Hence, the proposed method can be utilized in communication situations where different kinds of signals are available.

According to further aspects, each set of transmission weights is associated with a transmission beam configuration. Hence, it is provided for a signal to be transmitted according to an antenna pattern also described as the transmission beam configuration. This antenna pattern is created by applying the set of transmission weights to the antenna elements.

According to some aspects the disclosure proposes a computer readable storage medium, having stored there on a computer program which, when executed in a network node, causes the network node to execute the methods described above. Thus, there is provided herein computer programs, comprising computer readable code which, when run on an apparatus, causes the apparatus to perform any of the methods disclosed herein. The computer programs of the network node display advantages corresponding to the advantages already described in relation to the respective methods disclosed above.

According to some aspects the disclosure proposes a network node, in a communication system, the network node being configured for signal transmission, the network node comprises a network communication interface configured to receive and transmit signals for radio link evaluation. The network node further comprises processing circuitry configured to cause the network node to receive a signal with at least a partly known content and to apply, to the received signal, at least one set of reception weights out of plurality of predefined sets of reception weights. Moreover, each set of reception weights is associated with at least one reception beam parameter describing a reception beam configuration. The processing circuitry is further configured to determine, based on one or more predetermined criteria, at least one set of reception weights out of the applied predefined sets of reception weights and to generate at least one set of transmission weights. The at least one set of transmission weights is based on the at least one reception beam parameter and the at least one reception beam parameter corresponds to the determined at least one set of reception weights. The processing circuitry if further configured to transmit a signal using the generated at least one set of transmission weights.

Thus, there is provided herein a network node configured for signal transmission. The same advantages and benefits are obtained as for the corresponding features and steps of the previously discussed computer program and method, respectively.

According to further aspects the at least one set of transmission weights are associated with at least one transmission beam parameter and wherein the at least one reception beam parameter is equal to the at least one transmission beam parameter.

According to further aspects the processing circuitry is further configured to generate at least one set of transmission weights by applying a mapping from the at least one reception beam parameter to the at least one set of transmission weights or by determining the at least one set of transmission weights as a function of the at least one reception beam parameter or by retrieving the at least one set of transmission weights from a look-up table of the at least one reception beam parameter or by retrieving the at least one set of transmission weights from a look-up table using the at least one reception beam parameter as look-up key or by determining the at least one r set of transmission weights by an iterative process or any combination thereof.

According to further aspects the plurality predefined sets of reception weights comprises at least two predefined sets of reception weights and any combinations thereof.

According to further aspects the at least one beam parameter is at least one of beam direction, beam width, sidelobe levels, and polarization properties.

According to further aspects the predetermined criteria is based on at least one of received signal energy, received signal power, signal-to-noise ratio SNR, signal-to-interference-plus-noise ratio, SINR and signal-to-interference ratio, SIR.

According to further aspects the predefined sets of reception weights and/or the at least one generated set of transmission weights represent Discrete Fourier Transform, DFT, beams, widened beams, suppressed sidelobes beam variants and/or amplitude-tapered beam variants or combinations thereof.

According to further aspects the received signal is a reference signal, a sounding signal, a synchronization signal, a mobility reference signal, MRS, a Reciprocity Reference Signal, RRS, a sounding reference signal, SRS, a pilot signal or an Uplink Synchronization Signal, USS.

According to further aspects each set of transmission weights is associated with a transmission beam configuration.

According to further aspects, the processing circuitry comprises a processor and a memory containing instructions executable by said processor.

According to some aspects the disclosure proposes a network node, in a communication system, the network node being configured for configuring radio link evaluation. The network node comprises a receiving module arranged to receive a signal with at least a partly known content and an applying module arranged to apply to the received signal at least one set of reception weights out of plurality of predefined sets of reception weights, wherein each set of reception weights is associated with at least one reception beam parameter describing a reception beam configuration. The network node further comprises a determining module arranged to determine, based on one or more predetermined criteria, at least one set of reception weights out of the applied predefined sets of reception weights and a generating module configured to generate at least one set of transmission weights said at least one set of transmission weights based on the at least one reception beam parameter, said at least one reception beam parameter corresponding to the determined at least one set of reception weights. The network node further comprises a transmitting module configured to transmit a signal using the generated at least one set of transmission weights.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

DETAILED DESCRIPTION

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise. Moreover, the term "associating" may cover all manners of encapsulation, attaching, inclusion, concatenation, pointer, reference, chain of pointers, chain of references etc.

It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means", "units" or "devices" may be represented by the same item of hardware.

A "wireless communication device", a "wireless device" or a "UE" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system, GPS, receiver; a personal communications system, PCS, user equipment that may combine a cellular radiotelephone with data processing; a personal digital assistant, PDA, that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

The terms access point, access node, network node, radio node or radio network node or eNodeB are used interchangeably throughout the text in the example embodiment description.

Some of the example embodiments presented herein are directed towards mechanisms that provides enhanced efficiency in mobile communication by utilizing well suited communication channels. As part of the development of the example embodiments presented herein, a problem will first be identified and discussed.

The presented methods, computer programs and devices disclose how to find well suited communications channels. The inventors have realised that reciprocity between the uplink and downlink can be achieved in situations where the channel and/or the reception/transmission circuitry are not reciprocal per se, for example in the cases where different frequencies are used in uplink and downlink or where different antennas are utilized for reception and transmission. The inventors have further realized that parameters of the reception beam in the uplink communication can be utilized in order to find antenna settings that when utilized in the downlink forms reciprocal uplink/downlink communication.

To facilitate the understanding of the proposed technique, aspects of reciprocity and beamforming are further discussed.

Reciprocity in wireless communication refers to the fact that it is assumed that the uplink has similar properties as the downlink. Hence, reciprocity describes the ability to use information from one channel (e.g., the uplink) in making determinations regarding another channel (e.g., the downlink).

Figure 1:
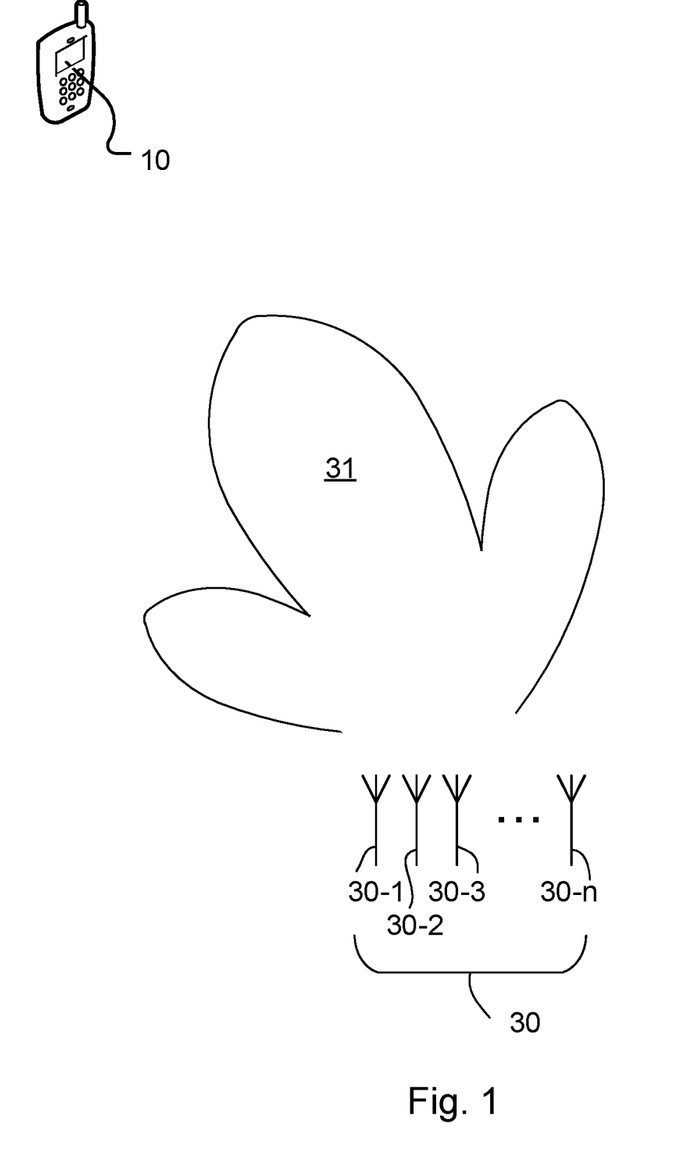
FIG. 1 depicts an antenna array capable of beamforming and a receiving UE.

Antennas comprising several antenna elements can be utilized to in beamforming, see an example in FIG. 1. In this illustrative drawing, an antenna 30 is communicating with a mobile device 10 by utilizing beamforming. There are several techniques of beamforming, e.g., DFT beams or related constructions (widened beams, amplitude-tapered variants, etc.). The resulting beam configuration 31 is e.g. an antenna pattern which can be described by beam parameters such as directions of its beams in azimuth and elevation and 3 dB beam width in azimuth and elevation. The antenna 30 comprises several antenna elements 30-1, 30-2, 30-3, . . . , 30-n. In order for the antenna 30 to receive or transmit with a specific beam configuration 31 weights are applied to the antenna elements. These weights control, for each element, how the signal, fed to or received by the antenna, is altered in amplitude and phase to form the desired beam. Depending on if the antenna receives or transmits the weights are denoted as reception/transmission weights.

Transmit beamforming is typically achieved by applying different weights to the signal for different antenna elements in the antenna array, i.e. the samples of the signal are multiplied by different complex numbers on its way through the transmitter circuitry to the different transmit antenna elements. By realizing the weights as complex numbers, both the amplitude and phase of the signal can be impacted. As an example, complex weights may be used to realize linear inter-antenna element phase shifting in regular arrays, which causes the transmitted signal to be amplified in a certain direction (or in a few directions—typically with stronger amplification in one direction and weaker amplification in a few other directions, often referred to as sidelobes). Receiver side beamforming is achieved in a similar manner, by multiplying the signal samples received from the different antenna elements of the receiver antenna array with different complex weights to ensure in-phase combining of signal components received from certain direction(s). In receivers, e.g. radio base stations, using fully digital processing of the received signals coming from the antenna elements, the weights can be applied to the signal in the digital domain, which allows the receiver entity to tentatively apply different sets of weights on the same signal, e.g. to find the best direction in which to point the receiver beam for the already received signal. That is, different receive beamforming directions may be tried through post-processing of the recorded received signal. In contrast, a receiver using analogue beamforming where the initial processing of the received signal is performed by analogue electronics, e.g. phase shifters, the receiver entity can only use one weight setting (and thus only apply one receive beam, e.g. beam direction) per one reception occasion.

Traditional reciprocity, based on using same transmission and reception weights, requires symmetric transmission and reception circuitry and channel. This is often the case in many anticipated 5G systems, operating in Time Division Duplex, TDD, mode and designed for massive Multi-user-MIMO functionality that relies on coherent reciprocity. However, there are also other deployment scenarios where the strict forms of reciprocity do not apply. For example, when antenna arrays, RF front ends, or the channel are not symmetric, e.g. in frequency division duplex, FDD, deployments, applying the same reception and transmission weights may not be physically meaningful.

One approach when reciprocity is not present is to rely on DOA, Direction of Arrival, estimation, as can be shown in Anderson, Soren, et al. "Ericsson/Mannesmann GSM fieldtrials with adaptive antennas. "Vehicular Technology Conference, 1997, IEEE 47th. Vol. 3. IEEE, 1997. The DOA estimation approach may work well in some propagation environments where single directions suffice to describe the channel, e.g. in Line of Sight, LOS,-dominated scenarios. However, in scenarios with more reflections, refractions and high angle spread, the DOA estimation algorithms are not reliable and the result may not reflect the best beam configuration with different beam width settings in azimuth and elevation. Furthermore, quantizing the continuous DOA estimate to match one of the candidate beam alternatives may incur suboptimal decisions in the more complex scenarios.

The inventors have realized that there is a way to achieve channel reciprocity in cases where it is not physically meaningful to utilize the same reception and transmission weights. It is presented a solution that allows evaluating different predetermined uplink reception beam configurations. Hence, in comparison with prior art where a Direction of Arrival, DOA, was estimated, at least one reception beam configuration is determined, i.e. the received signal is matched with a complete antenna pattern, that receives the signal in the "best" way. This "best" reception beam configuration is then utilized to create a beam with matching properties in the downlink. Hence, matching uplink and downlink properties are achieved also in systems where coherent reciprocity, or reception weight reuse, is not valid.

Figure 2:
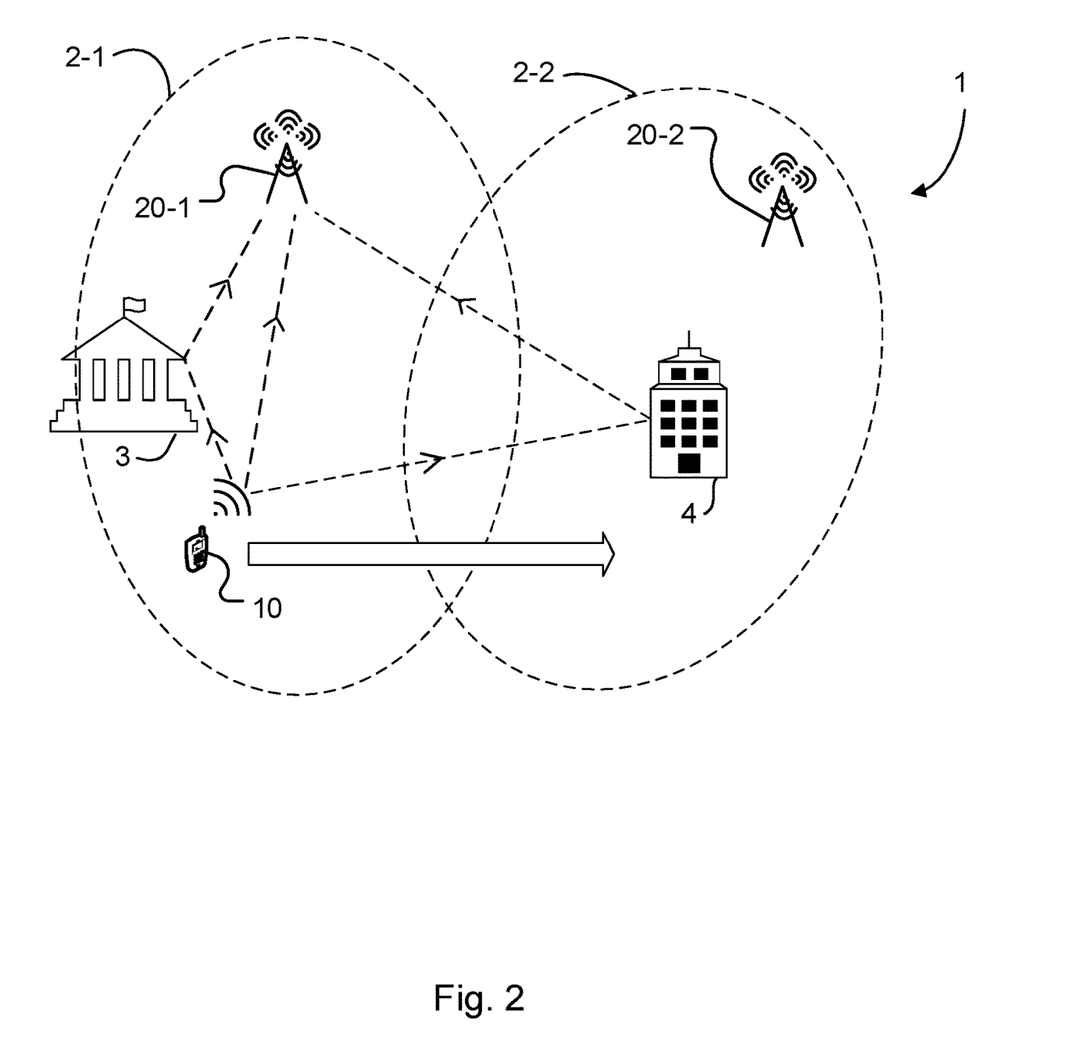
FIG. 2 is a wireless communication system illustrating a handover procedure.

An exemplary situation where the method of the disclosure can be used is shown in FIG. 2. The Figure shows a wireless communication system 1 comprising a UE 10 and network nodes 20-1, 20-2 all configured to communicate with different beam forming techniques. Hence, mobility procedures also need to address the problem of finding candidate beams and not only a target network node. The communication path between the UE 10 and the target network node 20-1 comprise to some extent obstacles 3, 4 and a multipath environment is present. Hence, the communication cannot be considered to be in Line of Sight, LOS.

The scenario described in FIG. 2 can for example be a handover process, where the UE 10 moves from the cell 2-1 covered by the network node 20-1 into the cell 2-2 covered by the network node 20-2. In other words, the handover is the process of transferring an ongoing connection of the UE 10 from one cell (the serving 2-1) to another cell (the target 2-2) in order to accomplish a transparent service over a larger area. The handover should happen without any loss of data and with as small interruption as possible.

To enable a handover, it is necessary to find a suitable target cell 2-2, and to ensure that it is possible to sustain reliable communication with that target cell 2-2. Candidates for suitable target cell are usually stored in so-called neighbor lists, which are stored at or at least from the serving base station 20-1. To make sure that it is possible to sustain reliable communication with the target cell 2-2, the connection quality in the target cell 2-2 needs to be estimated before the handover can take place.

The quality in the target cell 2-2 is estimated by measurements related to the UE 10. Both downlink or uplink measurements can be considered. In legacy systems, handover based on downlink measurements has been the most common solution, a natural solution as all base stations 20-1, 20-2 continuously transmit pilot signals that UEs in neighbor cells can use to estimate the target cell quality. This is true in GSM (BCCH), WCDMA (CPICH) and LTE (CRS) as well as in Wi-Fi (beacon). This leads to that it is possible to estimate the quality of neighbor cells with relatively good accuracy.

Modern cellular systems will use advanced antenna systems to a large extent. With such antennas, signals will be transmitted in narrow beams to increase signal strength in some directions, and/or to reduce interference in other directions. In order to maintain a robust connection to a moving UE 10 in such a system—the mobility function—the serving beam configuration must be updated continuously as the UE 10 moves through the network coverage area, i.e., from cell 2-1 to cell 2-2 in FIG. 2. The mobility solutions thus become beam based—in contrast to the traditional serving cell notion, it is no longer sufficient to identify the optimal serving cell or node, but also a suitable serving beam needs to be determined. In such beam evaluation process, typically a set of beams consisting of standard beam shapes with different direction and/or width settings are usually compared, and the one providing best quality according to some metric is selected as the serving beam.

In a system with advanced antennas, it becomes much more natural to rely on uplink measurements. Cellular systems may rely on uplink measurements already today: the UE 10 transmits some signal that several network nodes 20-1, 20-2 measure on. The measurements from all the relevant nodes, possibly according to several beam configuration options, are compared and the network decides on a suitable target node and a beam in that node.

For mobility decisions, both the uplink and downlink quality must be accounted for. If certain reciprocity conditions are satisfied the uplink reception measurements performed with a certain beam combining weights configuration may also be used to infer the downlink transmission performance. In this case the transmission weights are set to be the same as the reception weights and thus a suitable downlink beam is achieved.

If, on the other hand, certain reciprocity conditions are not satisfied then the present disclosure proposes a solution that can be utilized also when it is not appropriate to assume that the channel is reciprocal or when the reception and transmission circuitry differs, as exemplified in FIG. 2. It is proposed that the network node 20-2 receives a signal from the UE. The signal is received by applying different predefined reception beam configurations to the receiving antenna. It is further evaluated which of the predefined reception beam configurations give the best received signal. The parameters describing the reception beam configuration and knowledge of how to form such beam configuration is then utilized together with information of the transmitting antenna (e.g. inter-element distances) and the downlink channel (e.g. frequency) in order to determine transmission weights such that directional reciprocity is achieved.

This is different from the approach where a direction of arrival, DOA, estimation is performed. Again, in a DOA-estimation uplink measurements at a network node antenna array are used to determine the DOA, Direction of Arrival, of the received uplink signal from the UE. A transmission beam with the estimated direction is then generated in the downlink to transmit data to the UE.

In a multipath situation like that in FIG. 2, the DOA-estimation approach may return a mean of directions of signals arriving from several directions. In one example it might turn out that the signal strength is almost equal in two arriving directions relatively close to each other. By applying the DOA-estimation approach a preferred transmission beam direction might be a direction positioned in between the two almost equally strong beam directions. By applying the approach suggested by the inventors, two different beam configurations would be determined, each one being the most suitable for the specific signal path. Furthermore, either one or both beam configurations can be utilized to find a suitable downlink beam configuration. For example, if both beam configurations are chosen to be good candidates, the beam parameters corresponding to each of these beam configurations are utilized to find suitable transmission weights. According to some aspects, the transmitted signal can then be transmitted with equal signal strength by both beam configurations. In one example, the two beam configurations utilized in the downlink are approximately the same as the once determined as the "best" for reception.

Hence, one difference is that by utilizing the method in the claimed subject matter, the multiple single paths are considered and signals from different path are not aggregated into one preferable direction.

The described assumptions in previous paragraphs should not in any way be regarded as limiting to the scope of protection, since they are only made to facilitate a pedagogical explanation of the disclosure, i.e., the present disclosure may be utilized in other communication situations where beam forming are utilized.

The proposed method will be described as implemented at a network node using the example of generating a downlink transmission beam based on uplink reception measurements. However, the method can also be implemented in an access node, eNodeB, gNB, UE or any other suitable device to facilitate wireless communication. Moreover, the example given below is not exclusive and the method may also be used for e.g. beam-level mobility, or for (simple) link precoding selection for data transmission, or any other situation in wireless communication where beam formation is utilized.

The proposed methods will now be described in more detail referring to FIG. 3. The disclosure proposes a method in a network node, for signal transmission, or more specifically for determination of transmission weights for transmission beam generation. The method comprises receiving S1 a signal with at least a partly known content. The signal can for example be a signal suitable for uplink measurements transmitted by an UE. Different examples (non-exhaustive) of signals are: reference signal, a sounding signal, a synchronization signal, a mobility reference signal, MRS, a Reciprocity Reference Signal, RRS, a sounding reference signal, SRS, a pilot signal or an Uplink Synchronization Signal, USS. The signal may also comprise information not known to the network.

The signal is received by an antenna array comprising several antenna elements. The method can be utilized with both digital and analogue beam forming.

Figure 3:
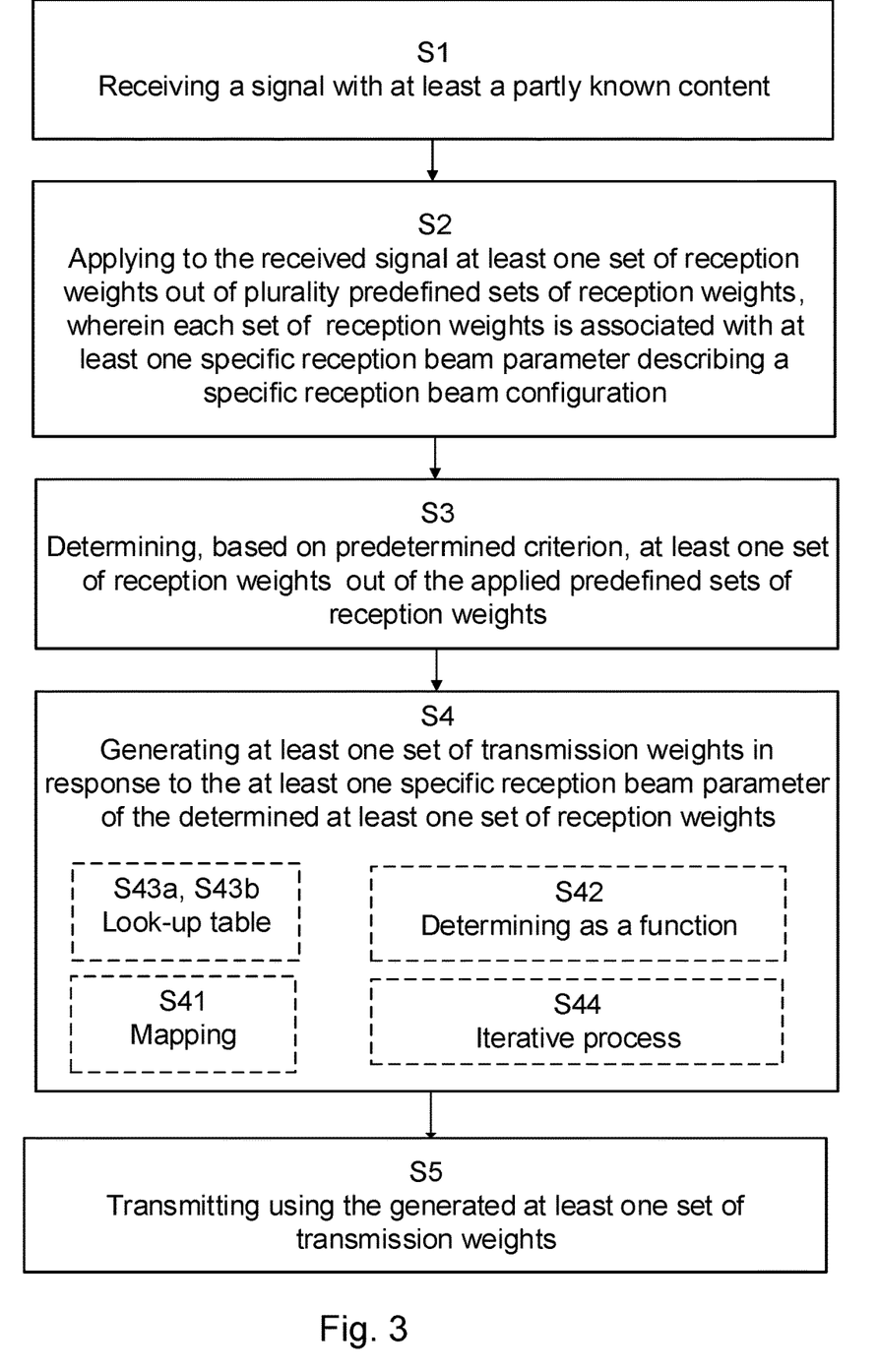
FIG. 3 is a flowchart illustrating embodiments of method steps.

The method exemplified in FIG. 3 further comprise applying S2 to the received signal at least one set of reception weights out of plurality of predefined sets of reception weights, wherein each set of reception weights is associated with at least one reception beam parameter describing a reception beam configuration.

In other words, reception weights are applied to each antenna element in order to form a specific antenna pattern, e.g. beam configuration. The antenna pattern can be described by its beam parameters e.g. the amplitudes, directions and width of the main lobe/s and sidelobes and the polarization of the electromagnetic field. Hence, the set of reception weights applied to create the antenna pattern are related to the beam parameters of said antenna pattern. It should be understood that applying the reception weights, applying the reception beam parameters or applying the reception beam configuration should be seen as equivalent procedures.

Hence, "applying" a specific beam configuration or a candidate beam means that the signal is received by the antenna according to the corresponding antenna directivity pattern.

The reception antenna can receive the signal by using several different reception beam configurations. This can be achieved in different ways. According to one aspect the beam forming is digital i.e. there is digital base band combining on the receiver side. The signal is recorded in a specific interval, e.g. during transmission of some OFDM symbols. According to some aspects no beam forming is utilized on the receiver side when the signal is recorded, hence all elements have weights corresponding to one. Different beam configurations are then applied to the recorded signal. Hence the signal is received S1 and the different sets of reception weights are applied S2 several times.

According to another aspect the beam forming is analogue. Then the UE repeats the transmitted signal sufficiently many times such that the network node can apply the different beamforming combinations. Hence, a set of reception weights are applied S2 then the signal is received S1, this procedure is then repeated for the desired number of predefined reception beam configurations.

Hence, the claimed subject matter provides for a method applicable to both digital and analogue equipment where the received signal quality is evaluated according to several pre-defined reception beam configuration.

According to some aspects, the plurality of predefined sets of reception weights comprises at least two predefined sets of reception weights and any combinations thereof. In one exemplary a set of transmission weights can be a set of composite/hybrid transmission weights formed by a combination of two or more of the predefined sets of receptions weights.

According to further aspects, the plurality of predefined sets of reception weights comprises interpolation between two or more of the predefined sets of reception weights and/or a corresponding interpolation between the matching beam parameters.

According to further aspects, the predefined sets of reception weights represent Discrete Fourier Transform, DFT, beams, widened beams, suppressed sidelobes beam variants and/or amplitude-tapered beam variants or combinations thereof. In other words, the beam parameter-based characterization may be DFT beams or extended to a wider class of beam designs, e.g. widened beam constructions, amplitude tapering to suppress sidelobes, etc.

That is, different classes of pre-defined beam forming configurations can be utilized. Moreover, in one exemplary embodiment, the predefined sets of reception weights comes from only one class, e.g. Discrete Fourier Transform, DFT, beams. In another exemplary embodiment, the predefined sets of reception weights come from multiple classes and where possible even combinations of sets from different classes can be utilized. The examples of beam classes are not exhaustive other ways of forming beam configurations may also be utilized.

By pre-defined sets of reception weights it is meant that a certain number of sets of reception weights have been predetermined and these are available to apply to the antenna elements.

Hence, it is provided for the skilled person to utilize various beam configurations or combinations thereof in order to create a desirable antenna pattern.

Within each class of predefined beam configurations the beam parameters can be elaborated upon. According to further aspects, the at least one beam parameter is at least one of beam direction, beam width, sidelobe levels, and polarization properties. The beam direction of the main lobe and possible the beam direction of the side lobes can be utilized to describe a beam configuration. Further, the 3 dB width of the lobes can for example be defined in the azimuth and elevation planes set by the antenna aperture in order to describe the configuration. The polarization properties are the polarization orientation of the electromagnetic field carrying the signal. Other ways of characterizing a beam configuration, known to the skilled person, may also be utilized.

Hence, the main idea of the disclosed subject matter is thus to use a small number of beam shape description parameters, instead of element weights, to associate matching beams on the reception and transmission sides. Having antennas comprising multiple antenna elements the method provides for a solution where the reception weight of each reception antenna element does not need to be taken into account. Instead a few beam parameters corresponding to the set of reception weights can be utilized. Hence the complexity of the problem is reduced.

The method further comprise determining (S3), based on one or more predetermined criteria, at least one set of reception weights out of the applied predefined sets of reception weights. As previously stated a set of reception weights corresponds to a reception beam configuration when applied to the antenna elements. In one exemplary the uplink receiver in an Access Node applies different candidate reception beam configurations and evaluates e.g. the received signal quality according to each, where after the best, according to the predetermined criteria, reception beam configuration is chosen. In one exemplary embodiment, the predetermined criteria can be the highest received signal energy.

According to further aspects, several sets of reception weights can be determined, either according to the same criteria or combination of criteria, or based on different criteria.

Determination of several sets of reception weights and thereby the possibility of generation of several sets of transmission weights provides for transmission with spatial diversity. This is favorable since the signal transmission is not dependent on transmission according to one single beam configuration. For example, in one unfavorable scenario the identified set of transmission weight might generate a signal that is faded due to channel dispersion or Doppler, and hence the signal transmission is reduced. If also the second and third "best" beam configuration are determined and utilized in the creation of transmission weights, this scenario is less likely to happen.

According to further aspects, the one or more predetermined criteria is based on at least one of received signal energy, received signal power, signal-to-noise ratio, SNR, signal-to-interference-plus-noise ratio, SINR and signal-to-interference ratio, SIR, or any other metric that can be utilized to determine features of the signal.

In an exemplary a combination of criteria is utilized in order to determine which set of reception weights gives the best received signal. In another exemplary it is of interest to utilize different predetermined criteria for different reception beam configurations. This could especially be the case where the reception beam configurations belong to different classes.

As previously stated, the reception beam configurations corresponding to the predefined sets of reception weights are characterized by a limited number of reception beam parameters. Hence, when a set of reception weights is determined then the corresponding limited set of beam parameters are known and can be utilized in the process instead of the larger amount of reception weights.

The same applies if several reception beam configurations are determined.

Different approaches can be utilized for the determination of the desired set of reception weights depending on if digital or analogue beam forming is utilized.

In one exemplary the access node implements digital beam forming and evaluating the different reception beam configurations amounts to applying different combining weights, i.e., different sets of reception weights, to the array element outputs in the baseband.

In another exemplary the access node implements analogue beamforming and evaluation amounts to spatial scanning using different array weights, e.g. applying different linear inter-element phase shift settings sequentially in time corresponding to different reception beam configurations. In this case it is assumed that the UE transmits multiple UL signals for measurements, e.g. repeating the same signal multiple times, to match the number of reception beam configurations that the access node needs to try. Alternatively, the uplink signal can be extended in time to match the time the access node needs to try a suitable number of reception beam configurations.

The method further comprises generating S4 at least one set of transmission weights, said at least one set of transmission weights based on the at least one reception beam parameter, said at least one reception beam parameter corresponding to the determined at least one set of reception weights. The reception beam parameters are chosen according to criteria such that it gives a sufficiently good signal reception. These reception beam parameters and knowledge of how to form a beam configuration based on these parameters are utilized in order to find transmission weights that will give a sufficiently good quality of a transmitted signal. In other words, a set of transmission weights is generated in response to the associated beam parameters of the best reception beam configuration. Depending on the situation, the skilled person has several alternatives of how to define a "sufficiently good" signal reception and a "sufficiently good" quality of a transmitted signal. According to some aspects, thresholds are defined for the signal reception and the quality of the transmitted signal. The beam parameters are then compared to corresponding thresholds in order to define the beam configuration can provide a sufficiently good signal. According to other aspects, evaluation of several beam parameters associated with different beam configurations is made such that, according to suitable metrics, the chosen beam parameters correspond to the "best" signal quality among the evaluated ones.

According to further aspects, each set of transmission weights is associated with a transmission beam configuration. As previously stated, when the transmission weights are applied to the antenna elements the antenna transmits with an antenna pattern, i.e. a beam configuration, determined by the transmission weights.

According to even further aspects the at least one generated set of transmission weights represent Discrete Fourier Transform, DFT, beams, widened beams, suppressed sidelobes beam variants and/or amplitude-tapered beam variants or combinations thereof. In other words, the transmission beam configuration may be DFT beams or extended to a wider class of beam designs, e.g. widened beam constructions, amplitude tapering to suppress sidelobes, etc.

According to further aspects the at least one set of transmission weights are associated with at least one transmission beam parameter and wherein the at least one reception beam parameter is equal to the at least one transmission beam parameter.

As with the reception weights, the transmission weights generate a transmission antenna pattern when applied to the antenna elements. This transmission antenna pattern corresponds to a transmission beam configuration which is described by certain transmission beam parameters. Hence, it is disclosed that beam shape parameters of the best uplink reception beam are used to determine appropriate transmission weights to generate a beam with matching properties in the downlink. This means that the transmission beam configuration is equal to the reception beam configuration even though the reception weights and the transmission weights differ.

This ensures that the properties of the transmission beam configuration match the properties of the best beam configuration identified on the reception side, regardless of the element weights that are required to generate the respective beams.

Having the reception beam parameter/s being equal to the transmission beam parameter/s is to be interpreted as being "substantially equal". Further, having the reception beam parameter/s substantially equal to the transmission beam parameter/s means in one exemplary that the parameter values are equal within a tolerance level. In another exemplary the parameter values are substantially equal in the sense that the transmission beam parameters generate a transmission beam that generate a signal quality and/or signal strength of the received signal at a reception point, e.g. an UE, that is substantially equal to the signal quality and/or signal strength that would have been received by utilizing transmitting beam parameters equal to the receiving beam parameters. In a further exemplary, "substantially equal" is to be interpreted as the resulting transmission beam will be good enough to reach the UE with high enough Signal to Noise Ratio, SNR, in the vast majority of the cases.

According to further aspects the transmission beam parameter/s differs from the reception beam parameter/s. This can for example be in a situation where reception and transmission are performed at different frequencies or where the circuitry of the transmission antenna is not suitable to produce a specific beam configuration. These situations are in such cases accounted for in the step of generating S4. In one exemplary, where the transmission circuitry is not suitable for generating all of the predetermined beam configurations, the mapping from the reception beam parameters to the transmission beam parameters has rules to deal with the situation, e.g., the transmission beam parameters are set such that the transmission signal quality will be as good as possible considering the conditions. These rules can be set as default in the system or they can be found in iterative processes where signals originating from different beam configurations are evaluated.

Depending on which beam configurations are considered and how these can be represented different approaches can be taken in the generation of the set of transmission weights. Hence, to generate S4 further comprises at least one of the following:

applying S41 a mapping from the at least one reception beam parameter to the at least one set of transmission weights, determining S42 the at least one set of transmission weights as a function of the at least one reception beam parameter, determining (S42) the at least one set of transmission weights as a function of the at least one reception beam parameter;

retrieving (S43a) the at least one set of transmission weights from a look-up table of the at least one reception beam parameter;

retrieving (S43b) the at least one set of transmission weights from a look-up table using the at least one reception beam parameter as look-up key;

determining (S44) the at least one set of transmission weights by an iterative process;

or any combination thereof

These different approaches can be utilized by themselves, in any combination, or combined with other suitable generation approaches. Hence, the skilled person is provided with a wide range of optional ways in which he can generate the set/s of transmission weights in order to achieve the desired transmission weights.

In order to explain the generation of the transmission weights, the element weights, i.e. the reception weights and the transmission weights are further discussed. According to some aspects the element weights may constitute linear phase shifts along one or two dimensions of the linear or planar array, respectively. The element weights depend on various design choices like the element spacing, wavelength, number of antenna elements, and parameters associated with the specific beam forming. Moreover, for each array design and beam configuration, a set of beam parameters can be associated with a set of element weights. Hence, the element weights can in one exemplary be expressed as functions of beam parameters corresponding to the desired beam configuration. In this way, when the desired beam parameters are known, i.e. the reception beam parameters, these are utilized to create transmission beam parameters with a similar beam pattern.

Expressed differently and according to further aspects, transmission beam configurations similar to the reception beam configuration may be created via mapping from the reception parameter/s to the set/s of transmission weights for different reception and transmission array designs, e.g. operating in different frequency bands in uplink and downlink, or using separate reception and transmission panels with different element spacing and array sizes.

To further elaborate how the generation of transmission weights can be done an example is given where DFT beam configurations are utilized. These beam configurations can be candidate beam shapes used for beam finding of regular arrays. The element weights depend on various design choices like the element spacing, wavelength, number of antenna elements, DFT oversampling, etc. The mapping from the desired pointing direction and beam width to corresponding transmission weights is defined via a DFT and a visible region definition and/or possible additional mapping operations.

A look-up table can also be utilized in order to retrieve S43a transmission weights. According to aspects, input to a look-up table can be the reception beam parameters, the reception beam configuration or the reception weights or any combination thereof. The skilled person is aware of several ways of implementing a look-up table. Further, the look-up table may also been seen as look-up procedure where e.g. at least one reception beam parameter is utilized as a starting key in order to retrieve the transmission weights.

An iterative process might also be used to determining S44 the at least one set of transmission weights. One exemplary situation is where the network node is equipped with a SON, Self-Optimizing Network, function to fine-tune matching parametric beam description. This is further exemplified with a handover process. That is, during configuration of the uplink measurement procedure, the UE is informed, e.g. by the source network node, of the number of uplink signal repetitions or the duration of the uplink signal. This could be tuned on a case by case basis, e.g. per network node pair (i.e. combination of source network node and candidate/target network node) based on evaluation of prior similar procedures (e.g. handover of UEs between the same source/target network node pair). Such evaluation and tuning could be a continuously ongoing process, i.e. a SON function.

As an option, after determining S3 the matching downlink beam, the chosen downlink beam parameters are then immediately (within a timespan in which the radio conditions can be expected to be fairly stable) evaluated and tuned based on downlink quality measurement feedback from the UE. The results are fed into the above mentioned SON algorithm for adaptation of the algorithm for derivation of downlink beam parameters.

To improve such SON based tuning, an network node may, occasionally or during a training/tuning period, apply downlink beam parameters that deviate slightly from the ones produced by the downlink beamforming parameter derivation algorithm, in order to evaluate whether the output of the algorithm seems to be optimal or if slight modifications of the downlink beam parameters (and thus a corresponding adaptation of the algorithm) would be better. The network node could as a further option also choose a set of downlink beamforming configurations (including the one the algorithm considers as the best and some configurations close to it) and try them sequentially with quality measurement feedback from the UE on each of them. This would allow more immediate and accurate comparison of different beam configuration alternatives for tuning of the downlink beamforming parameter derivation algorithm and may be used during a training/tuning period and/or occasionally during regular operation.

The above example situation of the SON function equipped in a handover process should not be seen as limited in any way. The above procedure can be utilized in any suitable communication procedure.

The method exemplified in FIG. 3 further comprise transmitting S5 a signal using the generated at least one set of transmission weights. That is, the best beam parameters have been used to generate transmission weights for a matching downlink beam.

Again, depending on the beamforming implementation (digital or analogue), this may amount to per-element baseband processing or configuring the array to apply certain phase shifts.

According to aspects, the disclosed subject matter is utilized in a scenario where an uplink based handover decision is applied to the downlink. That is, the network determines the uplink reception quality metric and infers the downlink quality based on the uplink reception metric.

According to further aspects, the transmission precoding, i.e. the determination of transmission weights, may parametrically include transmission in several preferred reception beam directions, to obtain spatial diversity, i.e. a hybrid approach. Hence, the incoming signal is received by multiple predefined reception beam configurations and more than one "best" beam configuration is chosen. For, each of these "best" configurations corresponding beam parameters are utilized to generate transmission weights such that spatial reciprocity is achieved. In other words, instead of a single best reception beam configuration, several elementary beam components detected in the uplink may be included when configuring precoding, i.e. transmission weights, for downlink transmission.

In one exemplary of the hybrid approach the criteria is set such that several reception beam configurations are singled out in the step S3. The criteria can for example be set such that all reception beam configurations that contribute with a non-negligible fraction of the total signal energy received with all candidate beams are chosen.

In the referred exemplary, the level of directional reciprocity assumed does not allow coherent phase steering of the components to ensure alignment of the several components at the UE. However, transmission energy can be directed towards several dominant beam directions, proportionally power-weighted. This provides spatial diversity. This is favorable since the signal transmission is not dependent on transmission according to a single beam configuration. For example, the identified strongest component might be faded due to channel dispersion or Doppler, and hence the received signal power is reduced.

A hybrid approach improves the diversity if the receiving UE has multiple antennas and is able to do coherent spatial combining, i.e. the UE can combine the individual propagation path contributions coherently. According to aspects this is the case if the UE has a multi-antenna array with digital beamforming.

According to further aspects, the hybrid approach may be turned off by the network for UEs which are not capable of coherent spatial combining. This can for example be the case if the UE only has a single-antenna (omni-directional) reception capability or analog beamforming. Then the hybrid transmission beam formation may be undesirable, since the number of degrees of freedom of the effective channel is not increased, but the expected received energy is decreased. According to some aspects, the UE can signal its reception capability to the network, e.g. as a part of the regular UE capability signaling, which typically takes place when the UE initially attaches to the network, and the network may select the appropriate TX precoding mode (single beam configuration or hybrid) based on the UE capability.

In a further alternative exemplary, the multiple elementary beams are used for sequential transmission, with equal/full energy, or energy proportional to their respective channel powers, in each of the elementary beams. Hence, several "best" beam configurations are determined and the corresponding beam parameters are utilized to find corresponding sets of transmission weights. The downlink signal is then transmitted with suitable energy by applying the different sets of transmission weights sequentially to the antenna elements.

The same principle of sequential transmission could be used in another exemplary where the network node uses analog transmission beamforming.

In cases where the downlink signal is transmitted by different beam configurations in sequence, the UE can according to some aspects combine the different transmissions one by one sequentially. This approach can e.g. be used for Hybrid Automatic Repeat Request, HARQ, retransmissions. That is, for each HARQ retransmission a different elementary beam is used to provide spatial diversity, e.g. in combination with incremental redundancy and chase combining.

The various example embodiments described herein are described in the general context of method steps or processes, which may be implemented in one aspect by a computer program product, embodied in a computer-readable medium, including computer-executable instructions, such as program code, executed by computers in networked environments. In other words, the disclosed subject matter refers to a computer readable storage medium. The computer readable storage medium has stored there on a computer program which, when executed in a network node 20, causes the network node 20 to execute the methods as previously described. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed in FIG. 3. The particular sequence of such executable instructions or associated data structures represents examples of corresponding acts for implementing the functions described in such steps or processes.

Figure 4:
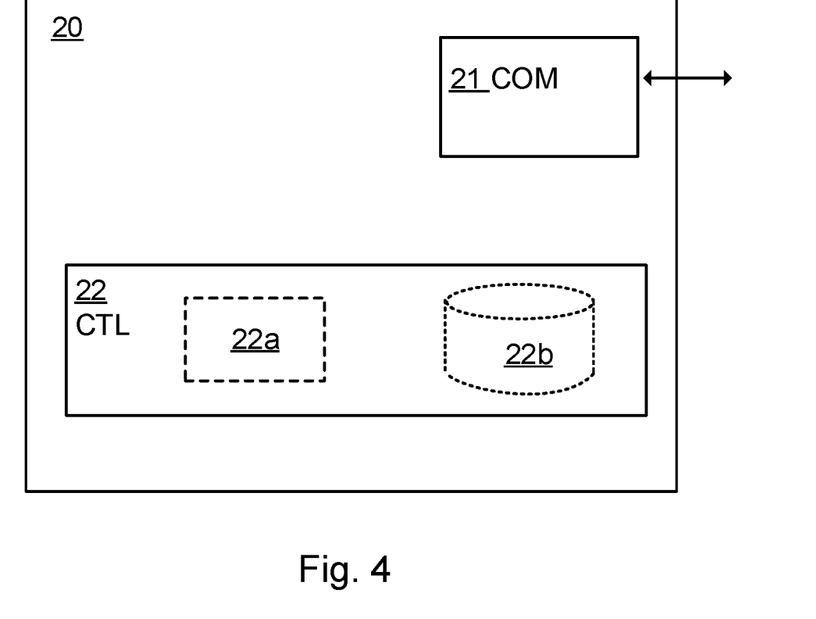
FIG. 4 is a block diagrams illustrating embodiments of a network.

FIG. 4 is an example configuration of a network node 20, in a communication system, which may incorporate some of the example embodiments discussed above. The network node 20 is configured for signal transmission and it comprises a network communication interface 21 configured to receive and transmit signals for radio link evaluation. The network communication interface 21 comprises communications circuitry arranged to transmit and/or receive communications signals from other wireless devices. It should further be appreciated that the communication interface 21 may be in the form of any input/output communications port known in the art.

The network node further comprises processing circuitry 22 arranged to control operation of the network node. In particular, the processing circuitry 22 is configured to cause the network node 20 to receive a signal with at least a partly known content, and to apply, to the received signal, at least one set of reception weights out of plurality of predefined sets of reception weights. Moreover, each set of reception weights is associated with at least one reception beam parameter describing a reception beam configuration. The processing circuitry 22 is further configured to determine, based on one or more predetermined criteria, at least one set of reception weights out of the applied predefined sets of reception weights, and to generate at least one set of transmission weights. The said at least one set of transmission weights is based on the at least one reception beam parameter and the at least one reception beam parameter corresponds to the determined at least one set of reception weights. The processing circuitry 22 is further configured to transmit a signal using the generated at least one set of transmission weights. Thus, there is provided herein a network node configured for signal transmission or more specifically for determination of transmission weights for transmission beam generation. The same examples and further elaborations are to be applied as well as the same advantages and benefits are to be obtained as for the corresponding features and steps of the previously discussed computer programs and methods, respectively.

According to aspect, the at least one set of transmission weights are associated with at least one transmission beam parameter and wherein the at least one reception beam parameter is equal to the at least one transmission beam parameter. Hence, the beam utilized to transmit the signal with is equal to the beam with which the signal was received. Thus reciprocity is achieved even in cases where the transmission weight cannot be set equal to the reception weights.

The processing circuitry can be configured in different ways in order to generate the set/s of transmission weight. That is, according to aspects the processing circuitry (22) further is configured to generate by at least one of the following:

applying a mapping from the at least one reception beam parameter to the at least one set of transmission weights;

determining the at least one set of transmission weights as a function of the at least one reception beam parameter;

retrieving the at least one set of transmission weights from a look-up table of the at least one reception beam parameter;

retrieving the at least one set of transmission weights from a look-up table using the at least one reception beam parameter as look-up key;

determining the at least one r set of transmission weights by an iterative process;

or any combination thereof.

According to further aspects, the plurality predefined sets of reception weights comprises at least two predefined sets of reception weights and any combinations thereof. In one example, the determination of several sets of reception weights and thereby the possibility of generation of several sets of transmission weights provides for transmission with spatial diversity.

According to further aspects in relation to the network node, the at least one beam parameter is at least one of beam direction, beam width, sidelobe levels, and polarization properties.

Moreover, according to further aspects, the predetermined criteria is based on at least one of received signal energy, received signal power, signal-to-noise ratio, SNR, signal-to-interference-plus-noise ratio, SINR and signal-to-interference ratio, SIR.

According to even further aspects, the predefined sets of reception weights and/or the at least one generated set of transmission weights represent DFT beams, widened beams, suppressed sidelobes beam variants and/or amplitude-tapered beam variants or combinations thereof.

According to aspects, the received signal is a reference signal, a sounding signal, a synchronization signal, a mobility reference signal, MRS, a Reciprocity Reference Signal, RRS, a sounding reference signal, SRS, a pilot signal or an Uplink Synchronization Signal, USS.

According to further aspects, each set of transmission weights is associated with a transmission beam configuration.

According to further aspects, the processing circuitry 22 comprises a processor 22a and a memory 22b containing instructions executable by said processor. The processor 22a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

The memory 22b may further be configured to store received or transmitted data and/or executable program instructions. The memory 22b may be any suitable type of computer readable memory and may be of volatile and/or non-volatile type.

According to aspects it is provided for a network node 30, in a communication system, the network node being configured for configuring radio link evaluation. The network node, as illustratively shown in FIG. 5, comprises modules configured to perform the methods described above. The modules are implemented in hardware or in software or in a combination thereof. The modules are according to some aspect implemented as a computer program stored in a memory which is run on a processing circuitry. The same examples and further elaborations are to be applied as well as the same advantages and benefits are to be obtained as for the corresponding features and steps of the previously discussed computer programs and methods, respectively.

Figure 5:
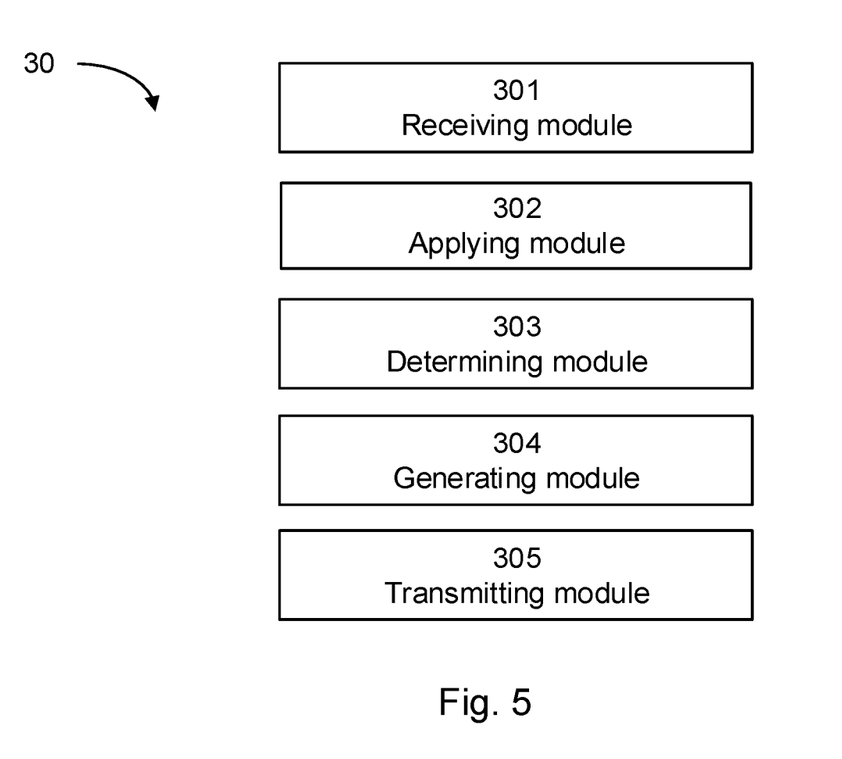
FIG. 5 is a block diagrams illustrating embodiments of a network.

According to aspects the network node comprises a receiving module 301 arranged to receive a signal with at least a partly known content.

According to some aspects the network node comprises an applying module 302 arranged to apply to the received signal at least one set of reception weights out of plurality of predefined sets of reception weights, wherein each set of reception weights is associated with at least one reception beam parameter describing a reception beam configuration.

According to some aspects the network node comprises a determining module 303 arranged to determine, based on one or more predetermined criteria, at least one set of reception weights out of the applied predefined sets of reception weights.

According to aspects the network node comprises a generating module 304 configured to generate at least one set of transmission weights said at least one set of transmission weights based on the at least one reception beam parameter, said at least one reception beam parameter corresponding to the determined at least one set of reception weights;

According to aspects the network node comprises a transmitting module 305 configured to transmit a signal using the generated at least one set of transmission weights.

According to aspects the at least one set of transmission weights are associated with at least one transmission beam parameter and wherein the at least one reception beam parameter is equal to the at least one transmission beam parameter.

According to aspects the generating module 304 further comprises at least one of the following:

an applying module arranged to receive a mapping from the at least one reception beam parameter to the at least one set of transmission weights;

a determining module arranged to determine the at least one set of transmission weights as a function of the at least one reception beam parameter;

a first retrieving module arranged to retrieve the at least one set of transmission weights from a look-up table of the at least one reception beam parameter;

a second retrieving module arranged to retrieve the at least one set of transmission weights from a look-up table using the at least one reception beam parameter as look-up key;

a determining module arranged to determine the at least one set of transmission weights by an iterative process;

or any combination thereof.

According to aspects the plurality predefined sets of reception weights comprises at least two predefined sets of reception weights and any combinations thereof.

According to aspects the at least one beam parameter is at least one of beam direction, beam width, sidelobe levels, and polarization properties.

According to aspects the one or more predetermined criteria is based on at least one of received signal energy, received signal power, signal-to-noise ratio, SNR, signal-to-interference-plus-noise ratio, SINR, and signal-to-interference ratio, SIR.

According to aspects the predefined sets of reception weights and/or the at least one generated set of transmission weights represent Discrete Fourier Transform, DFT, beams, widened beams, suppressed sidelobes beam variants and/or amplitude-tapered beam variants or combinations thereof.

According to aspects the received signal is a reference signal, a sounding signal, a synchronization signal, a mobility reference signal, MRS, a Reciprocity Reference Signal, RRS, a sounding reference signal, SRS, a pilot signal or an Uplink Synchronization Signal, USS.

According to aspects each set of transmission weights is associated with a transmission beam configuration.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method in a network node, for signal transmission, the method comprising:
receiving a signal with at least a partly known content;
applying to the received signal at least one set of reception weights out of plurality of predefined sets of reception weights, wherein each set of reception weights is associated with at least one reception beam parameter describing a reception beam configuration;
determining, based on one or more predetermined criteria, at least one set of reception weights out of the applied predefined sets of reception weights;
generating at least one set of transmission weights, said at least one set of transmission weights based on the at least one reception beam parameter, said at least one reception beam parameter corresponding to the determined at least one set of reception weights;
transmitting a signal using the generated at least one set of transmission weights.

2. The method according to claim 1, wherein the at least one set of transmission weights are associated with at least one transmission beam parameter and wherein the at least one reception beam parameter is equal to the at least one transmission beam parameter.

3. The method according to claim 1, wherein to generate further comprises at least one of the following:
applying a mapping from the at least one reception beam parameter to the at least one set of transmission weights;
determining the at least one set of transmission weights as a function of the at least one reception beam parameter;
retrieving the at least one set of transmission weights from a look-up table of the at least one reception beam parameter;
retrieving the at least one set of transmission weights from a look-up table using the at least one reception beam parameter as look-up key;
determining the at least one set of transmission weights by an iterative process;
or any combination thereof.

4. The method according to claim 1, wherein the plurality of predefined sets of reception weights comprises at least two predefined sets of reception weights and any combinations thereof.

5. The method according to claim 1, wherein the at least one beam parameter is at least one of beam direction, beam width, sidelobe levels, and polarization properties.

6. The method according to claim 1, wherein the one or more predetermined criteria is based on at least one of received signal energy, received signal power, signal-to-noise ratio, SNR, signal-to-interference-plus-noise ratio, SINR and signal-to-interference ratio, SIR.

7. The method according to claim 1, wherein the predefined sets of reception weights and/or the at least one generated set of transmission weights represent Discrete Fourier Transform, DFT, beams, widened beams, suppressed sidelobes beam variants and/or amplitude-tapered beam variants or combinations thereof.

8. The method according to claim 1, wherein the received signal is a reference signal, a sounding signal, a synchronization signal, a mobility reference signal, MRS, a Reciprocity Reference Signal, RRS, a sounding reference signal, SRS, a pilot signal or an Uplink Synchronization Signal, USS.

9. The method according to claim 1, wherein each set of transmission weights is associated with a transmission beam configuration.

10. A network node configured for operation in a communication system, the network node comprising:
a network communication interface configured to receive and transmit signals for radio link evaluation;

processing circuitry configured to cause the network node to:
- receive a signal with at least a partly known content,
- apply, to the received signal, at least one set of reception weights out of plurality of predefined sets of reception weights, wherein each set of reception weights is associated with at least one reception beam parameter describing a reception beam configuration,
- determine, based on one or more predetermined criteria, at least one set of reception weights out of the applied predefined sets of reception weights;
- generate at least one set of transmission weights, said at least one set of transmission weights based on the at least one reception beam parameter, said at least one reception beam parameter corresponding to the determined at least one set of reception weights;
- transmit a signal using the generated at least one set of transmission weights.

11. The network node according to claim 10, wherein the at least one set of transmission weights are associated with at least one transmission beam parameter and wherein the at least one reception beam parameter is equal to the at least one transmission beam parameter.

12. The network node according to claim 10, wherein the processing circuitry further is configured to generate by at least one of the following:
- applying a mapping from the at least one reception beam parameter to the at least one set of transmission weights;
- determining the at least one set of transmission weights as a function of the at least one reception beam parameter;
- retrieving the at least one set of transmission weights from a look-up table of the at least one reception beam parameter;
- retrieving the at least one set of transmission weights from a look-up table using the at least one reception beam parameter as look-up key;
- determining the at least one r set of transmission weights by an iterative process;
- or any combination thereof.

13. The network node according to claim 10, wherein the plurality predefined sets of reception weights comprises at least two predefined sets of reception weights and any combinations thereof.

14. The network node according to claim 10, wherein the at least one beam parameter is at least one of beam direction, beam width, sidelobe levels, and polarization properties.

15. The network node according to claim 10, wherein the predetermined criteria is based on at least one of received signal energy, received signal power, signal-to-noise ratio, SNR, signal-to-interference-plus-noise ratio, SINR, and signal-to-interference ratio, SIR.

16. The network node according to claim 10, wherein the predefined sets of reception weights and/or the at least one generated set of transmission weights represent Discrete Fourier Transform, DFT, beams, widened beams, suppressed sidelobes beam variants and/or amplitude-tapered beam variants or combinations thereof.

17. The network node according to claim 10, wherein the received signal is a reference signal, a sounding signal, a synchronization signal, a mobility reference signal, MRS, a Reciprocity Reference Signal, RRS, a sounding reference signal, SRS, a pilot signal or an Uplink Synchronization Signal, USS.

18. The network node according to claim 10, wherein each set of transmission weights is associated with a transmission beam configuration.

19. The network node according to claim 10, wherein the processing circuitry comprises a processor and a memory containing instructions executable by said processor.

20. A network node configured for operation in a communication system, the network node comprising:
- a receiving module arranged to receive a signal with at least a partly known content;
- an applying module arranged to apply to the received signal at least one set of reception weights out of plurality of predefined sets of reception weights, wherein each set of reception weights is associated with at least one reception beam parameter describing a reception beam configuration;
- a determining module arranged to determine, based on one or more predetermined criteria, at least one set of reception weights out of the applied predefined sets of reception weights;
- a generating module configured to generate at least one set of transmission weights said at least one set of transmission weights based on the at least one reception beam parameter, said at least one reception beam parameter corresponding to the determined at least one set of reception weights;
- a transmitting module configured to transmit a signal using the generated at least one set of transmission weights.

* * * * *